(12) United States Patent
Matsuzawa et al.

(10) Patent No.: US 7,907,949 B2
(45) Date of Patent: Mar. 15, 2011

(54) RADIO COMMUNICATION SYSTEM, ADJACENT STATION INFORMATION MANAGEMENT METHOD FOR THIS SYSTEM, AND MANAGEMENT APPARATUS THEREFOR

(75) Inventors: Kouhei Matsuzawa, Yokohama (JP); Hiroshi Shouda, Yokohama (JP); Kouichi Shiraishi, Yokohama (JP); Yoshiyuki Machida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1088 days.

(21) Appl. No.: 11/561,551

(22) Filed: Nov. 20, 2006

(65) Prior Publication Data

US 2009/0082021 A1 Mar. 26, 2009

(30) Foreign Application Priority Data

Mar. 14, 2006 (JP) ................................ 2006-069334

(51) Int. Cl.
*H04W 36/00* (2009.01)
(52) U.S. Cl. ......... 455/436; 455/440; 370/331; 370/332
(58) Field of Classification Search .................. 370/331, 370/332; 455/440
See application file for complete search history.

(56) References Cited

U.S. PATENT DOCUMENTS

| | | | | |
|---|---|---|---|---|
| 5,640,414 | A * | 6/1997 | Blakeney et al. ............. | 375/130 |
| 6,430,200 | B1 * | 8/2002 | Han et al. ...................... | 370/500 |
| 7,512,403 | B2 * | 3/2009 | Rajkotia et al. ............... | 455/438 |
| 2002/0111158 | A1 * | 8/2002 | Tee ................................ | 455/421 |

FOREIGN PATENT DOCUMENTS

| | | |
|---|---|---|
| JP | 09-284828 | 10/1997 |
| JP | 2000-333232 | 11/2000 |

OTHER PUBLICATIONS

ARIB, ARIB STD-T64-C.S0024-A v2.0, cdma2000 High Rate Packet Data Air Interface Specification, 3$^{rd}$ Generation Partnership Project 2 "3GPP2", Version 2.0, Jul. 2005, pp. 8-81 to 8-141.

* cited by examiner

*Primary Examiner* — Kamran Afshar
*Assistant Examiner* — Neda Behrooz
(74) *Attorney, Agent, or Firm* — Brundidge & Stanger, P.C.

(57) ABSTRACT

Adjacent station information of various base stations communicating using CDMA is automatically updated.

A maintenance apparatus (30) includes a protocol message acquisition unit (33) for acquiring protocol messages transmitted between each base station and a mobile terminal 1; a protocol message storage area (36) for storing the protocol messages; a base station information acquisition unit (34) for acquiring base station information of every base station; a base station information storage area (37) for storing the base station information of all the base stations; and an information update instruction unit (35). The information update instruction unit (35) extracts a Route Update message at the time of hard handoff from the protocol message storage area (36), and uses communication characteristic information of a handoff candidate base station included in that message, in order to specify the handoff candidate base station among base stations whose base station information is stored in the base station information storage area (37). The information update instruction unit (35) instructs the handoff source base station to add the information on the specified handoff candidate base station to its adjacent station information.

5 Claims, 10 Drawing Sheets

FIG. 2

BASE STATION INFORMATION 37

|  | ID | PN | Ch | LOCATION |
|---|---|---|---|---|
| BASE STATION A | IDa | PNa | Cha | LOCATION a |
| BASE STATION B | IDb | PNb | Chb | LOCATION b |
| BASE STATION C | IDc | PNc | Chc | LOCATION c |
| BASE STATION D | IDd | PNd | Chd | LOCATION d |
| BASE STATION E | IDe | PNe | Che | LOCATION e |
| ... | ... | ... | ... | ... |
| BASE STATION J | IDj | PNj | Chj | LOCATION j |
| BASE STATION K | IDk | PNk | Chk | LOCATION k |
| BASE STATION M | IDm | PNm | Chm | LOCATION m |
| BASE STATION N | IDn | PNn | Chn | LOCATION n |

FIG. 3

ADJACENT STATION INFORMATION 15

|  | ID | PN | Ch | LOCATION |
|---|---|---|---|---|
| BASE STATION ITSELF | IDa | PNa | Cha | LOCATION a |
| ADJACENT STATION 1 | IDb | PNb | Chb | — |
| ADJACENT STATION 2 | IDc | PNc | Chc | — |
| ADJACENT STATION 3 | IDd | PNd | Chd | — |
| ADJACENT STATION 4 | IDf | PNf | Chf | — |
| ADJACENT STATION 5 | IDj | PNj | Chj | — |
| ADJACENT STATION 7 | IDn | PNn | Chn | — |

Dm > Dn

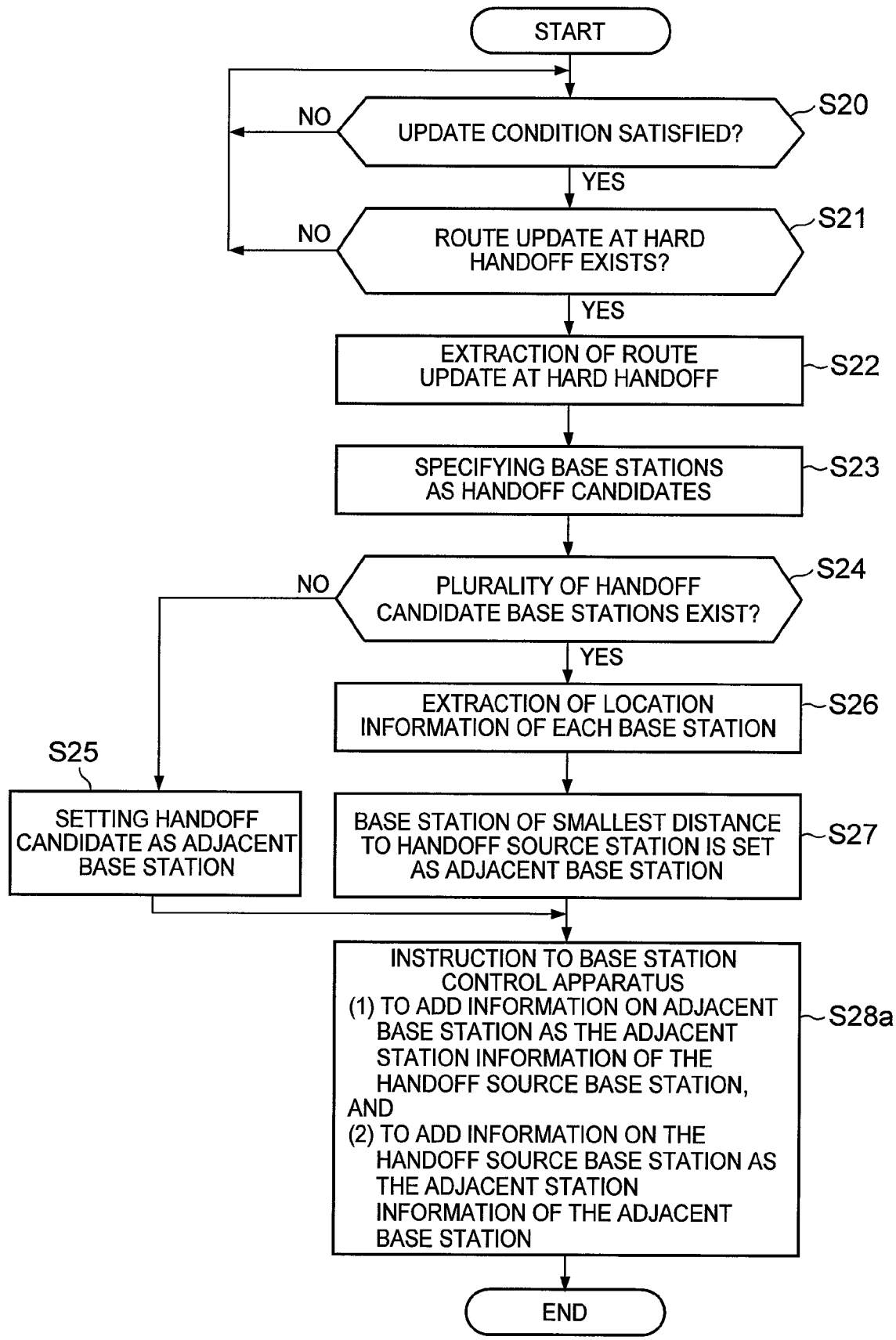

RADIO COMMUNICATION SYSTEM, ADJACENT STATION INFORMATION MANAGEMENT METHOD FOR THIS SYSTEM, AND MANAGEMENT APPARATUS THEREFOR

BACKGROUND OF THE INVENTION

The present invention relates to a radio communication system employing Code Division Multiple Access (CDMA), a method of managing adjacent station information in the radio communication system, and a management apparatus for the method.

In a radio communication system employing CDMA, by switching a base station, which is a communication partner of a mobile terminal, as the mobile terminal moves, the mobile terminal can communicate continuously, even when it moves. Technology for switching base stations, namely handoff technology, is disclosed in detail, for example, in TSG-C C.S.0024-A V2.0 issued by 3GPP2.

Handoff technology includes soft handoff and hard handoff. In soft handoff, communication of a mobile terminal is continuous, while in hard handoff a momentary break exists in communication of a mobile terminal. Basically, the handoff technology is standardized such that hard handoff is performed when soft handoff for continuing communication cannot be performed. A handoff source base station (i.e. a base station from which communication with a mobile terminal is changed to another base station) uses information of one or more base stations adjacent to it in order to perform soft handoff to an adjacent base station. In other words, to perform soft handoff, information on base stations adjacent to each base station is required.

Such adjacent station information should be changed not only in cases where a new base station is installed but also in cases where a communication environment is changed. Basically, change of adjacent station information or the like is carried out by hand.

However, such an operation is a burden to a communication service provider. Thus, methods of automatically updating adjacent station information have been developed. For example, such methods are described in Japanese Unexamined Patent Laid-Open No. 09-284828 (hereinafter, referred to as Patent Document 1) and Japanese Un-examined Patent Laid-Open No. 2000-333232 (hereinafter, referred to as Patent Document 2). In CDMA, basically a mobile terminal monitors radio waves from base stations other than a base station with which communication has been established. Thus, in the techniques described in Patent Documents 1 and 2, a base station, which is communicating with a mobile terminal, acquires communication characteristic information of other base stations from the mobile terminal in question, and adds the obtained information to adjacent station information.

SUMMARY OF THE INVENTION

According to techniques described in Patent Documents 1 and 2, adjacent station information can be updated automatically, when a new base station is installed, or the like. However, a base station has to perform non-standardized protocol message communication with a mobile terminal, in order to specify which is the base station whose communication characteristic information has been sent from the mobile terminal. A conventional mobile terminal cannot support these techniques. To support such a non-standardized protocol message, it is necessary to change the conventional base station. Thus, these techniques are insufficient for handling a conventional mobile terminal and a conventional base station.

The present invention has been made considering the existing problems described above. An object of the present invention is to provide a radio communication system, a management method for managing adjacent station information in that radio communication system, and a management apparatus for that method, so that adjacent station information can be updated automatically, for example, in the case where a new base station is installed, while dealing with conventional mobile terminals and conventional base stations.

To solve the above problems, the present invention provides an adjacent station information management apparatus in a radio communication system comprising a plurality of base stations communicating with mobile terminals using Code Division Multiple Access (CDMA), and a base station control apparatus controlling the plurality of base stations, the adjacent station information management apparatus managing: pieces of adjacent station information that are accessible respectively by the plurality of base stations, with each piece of adjacent station information including an identifier or identifiers of one or more adjacent base stations adjacent to a base station concerned, and communication characteristic information indicating communication characteristics of the adjacent base station or stations; or pieces of adjacent station information for the respective base stations, with each piece of adjacent station information being accessible by the base station control apparatus and including information on one or more adjacent base stations adjacent to a base station concerned, wherein: the adjacent station information management apparatus comprises: a protocol message acquisition means, which acquires, for each of the base stations under management of the base station control apparatus, protocol messages wirelessly transmitted between a mobile terminal and the base station in question; a protocol message storage area for storing protocol messages acquired by the protocol message acquisition means, with the protocol messages being stored for each of the base stations; a base station information acquisition means, which acquires a piece of base station information for each of the base stations under management of the base station control apparatus, with the piece of base station information including an identifier of a base station concerned and communication characteristic information indicating communication characteristics of the base station; a base station information storage area for storing the base station information acquired by the base station information acquisition means, with the base station information being stored for each of the base stations; and an information update instruction means, which: extracts, from the protocol message storage area, handoff request information sent from a mobile terminal to a handoff source base station at time of hard handoff; uses handoff candidate base station's communication characteristic information, included in the handoff request information, in order to specify a base station identifier corresponding to the communication characteristic information among a plurality of base station identifiers stored in the base station information storage area; and instructs a base station or the base station control apparatus that can access adjacent station information of the handoff source base station, to add the specified base station identifier of the handoff candidate base station and the communication characteristic information to the adjacent station information of the handoff source base station.

In the above-described adjacent station information management apparatus, it may be arranged that: the base station information acquisition means acquires location information of a base station in addition to the identifier and the communication characteristic information of the base station, as a piece of the base station information; and when the handoff request information includes a plurality of handoff candidate base stations, then the information update instruction means: extracts, from the base station information storage area, base station identifiers and pieces of location information corresponding to respective pieces of communication characteristic information of the plurality of handoff candidate base stations included in the handoff request information; extracts location information of the handoff source base station; specifies a handoff candidate base station closest to the handoff source base station among the plurality of handoff candidate base stations, based on the respective pieces of location information of those base stations; and instructs the base station or the base station control apparatus that can access the adjacent station information of the handoff base station to add the base station identifier and the communication characteristic information of the closest handoff candidate base station to the adjacent station information of the handoff source base station.

Further, in the above-described adjacent station information management apparatuses, it may be arranged that: the information update instruction means instructs a base station or the base station control apparatus that can access adjacent station information of the handoff candidate base station whose base station identifier and communication characteristic information are added to the adjacent station information of the handoff source base station, to add an identifier and communication characteristic information of the handoff source base station to adjacent station information of the handoff candidate base station.

Further, to solve the above problems, the present invention provides a radio communication system, comprising one of the above-described adjacent station information management apparatuses, the plurality of base stations and the base station control apparatus.

Further, to solve the above problems, the present invention provides an adjacent station information management method in a radio communication system comprising a plurality of base stations communicating with mobile terminals using CDMA and a base station control apparatus controlling the plurality of base stations, for managing: pieces of adjacent station information that are accessible respectively by the plurality of base stations, with each piece of adjacent station information including an identifier or identifiers of one or more adjacent base stations adjacent to a base station concerned, and communication characteristic information indicating communication characteristics of the adjacent base station or stations; or pieces of adjacent station information for the respective base stations, with each piece of adjacent station information being accessible by the base station control apparatus and including information on one or more adjacent base stations adjacent to a base station concerned, wherein: the adjacent station information management method performs: a protocol message acquisition step, in which, for each of the base stations under management of the base station control apparatus, protocol messages wirelessly transmitted between a mobile terminal and the base station in question are acquired, and the protocol messages for each of the base stations are stored in a protocol message storage area; a base station information acquisition step, in which, for each of the base stations under management of the base station control apparatus, base station information including an identifier of the base station in question and communication characteristic information indicating communication characteristics of the base station is acquired, and base station information of all the base stations is stored in a base station information storage area; and an information update instruction step, in which: handoff request information sent from a mobile terminal to a handoff source base station at time of hard handoff is extracted from the protocol message storage area; handoff candidate base station communication characteristic information included in the handoff request information is used to extract a base station identifier corresponding to the communication characteristic information among a plurality of base station identifiers stored in the base station information storage area; and an instruction is given to a base station or the base station control apparatus that can access adjacent station information of the handoff source base station to add the extracted base station identifier and the communication characteristic information to the adjacent station information of the handoff source base station.

According to the present invention, even when a new base station is installed, it is possible to automatically update adjacent station information of a base station adjacent to the newly installed base station. Further, according to the present invention, protocol messages generated by standardized operations of CDMA are stored, and an adjacent base station is specified based on these stored protocol messages and previously stored base station information. Thus, it is possible to automatically update adjacent station information without making any change to existing mobile terminals and existing base stations.

BRIEF DESCRIPTION OF THE DRAWINGS

FIG. 2 is an explanatory diagram showing a data configuration of base station information belonging to a maintenance apparatus in the first embodiment of the present invention;

FIG. 3 is an explanatory diagram showing a data configuration of adjacent station information belonging to each base station in the first embodiment of the present invention;

FIG. 10 is a flowchart showing operation of an information update instruction unit of a maintenance apparatus in the second embodiment of the present invention.

DETAILED DESCRIPTION OF THE PREFERRED EMBODIMENTS

Figure 1:
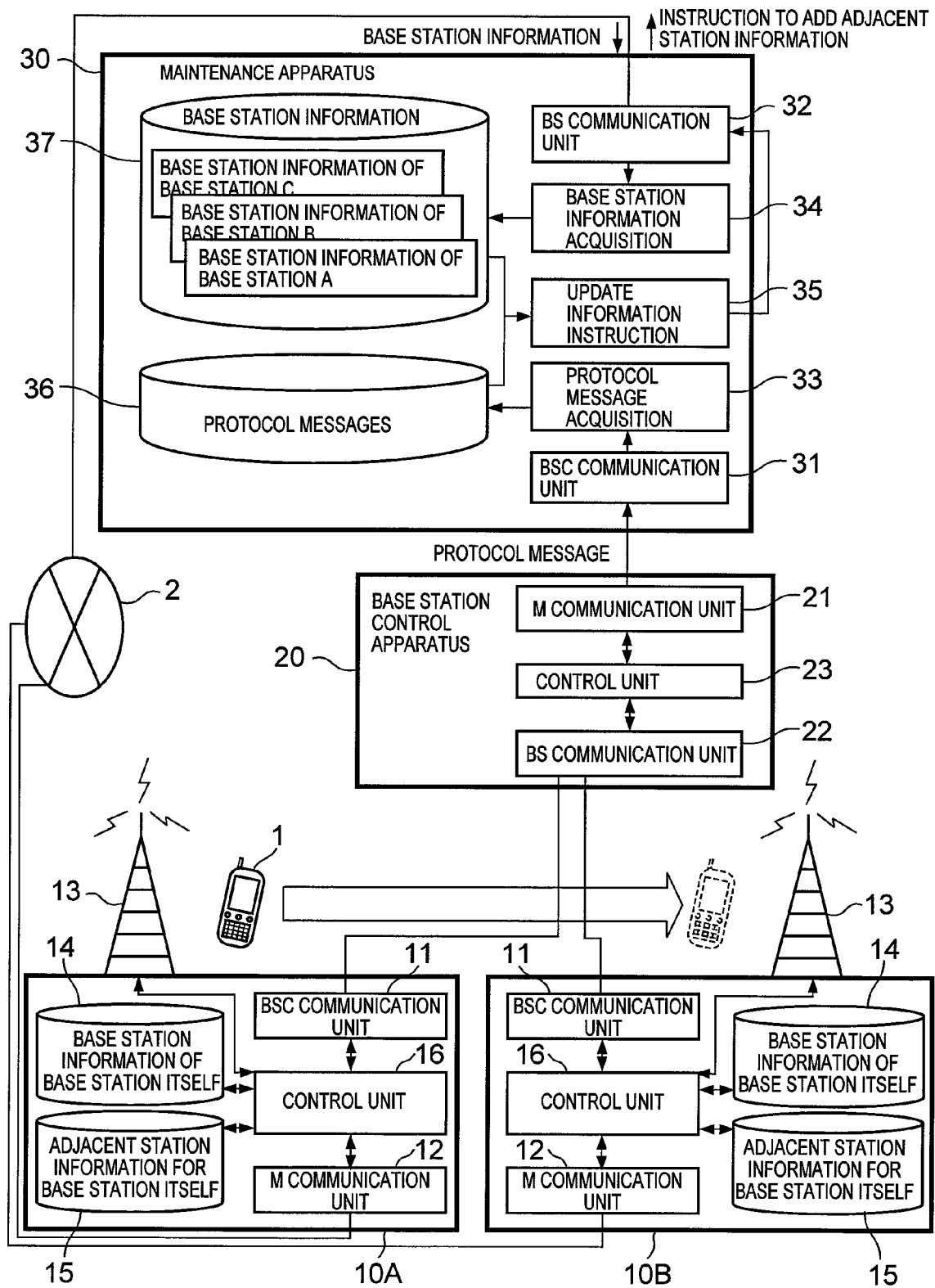
FIG. 1 is a schematic block diagram showing a radio communication system of a first embodiment according to the present invention.

Embodiments of a radio communication system according to the present invention will be described referring to the drawings.

To begin with, a first embodiment of a radio communication system will be described referring to FIGS. 1 to 8.

As shown in FIG. 1, the radio communication system of the present embodiment comprises: mobile terminals 1; a plurality of base stations 10A, 10B, ... that communicate according to Code Division Multiple Access (CDMA); a base station control apparatus 20 that controls the base stations 10A, 10B, ...; and a maintenance apparatus 30 that manages information and the like, of each base station.

Each base station 10A, 10B, ... comprises: a control-apparatus-side communication unit (hereinafter, referred to as BSC communication unit) 11 that communicates with the base station control apparatus 20; a maintenance-apparatus-side communication unit (hereinafter, referred to as M communication unit) 12 that communicates with the maintenance apparatus 30 through a network 2 or the like; an antenna 13 for communication with a mobile terminal 1; a base station information storage area 14 that stores base station information of its own base station; an adjacent station information storage area 15 that stores adjacent station information, i.e., information of a base station adjacent to its own base station; and a control unit 16 that controls these component units. Contents of the base station information concerning its own base station and the adjacent station information will be described later.

The base station control apparatus 20 comprises: a maintenance-apparatus-side communication unit (hereinafter, referred to as M communication unit) 21 that communicates with the maintenance apparatus 30; a base-station-side communication unit (hereinafter, referred to as BS communication unit) 22 that communicates with each base station 10A, 10B, ...; and a control unit 23 that controls these component units.

The maintenance apparatus 30 comprises: a control-apparatus-side communication unit (hereinafter referred to as BSC communication unit) 31 that communicates with the base station control apparatus 20; a base-station-side communication unit (hereinafter, referred to as BS communication unit) 32 that communicates with each base station 10A, 10B, through the network 2 or the like; a protocol message acquisition unit 33 that acquires protocol messages transmitted between each base station and a mobile terminal; a protocol message storage area 36 that stores protocol messages acquired by the protocol message acquisition unit 33; a base station information acquisition unit 34 that acquires base station information of each base station 10A, 10B, ...; a base station information storage area 37 that stores base station information acquired by the base station information acquisition unit 34 for each base station 10A, 10B, ...; and an information update instruction unit 35 that instructs each base station 10A, 10B, ... to update its adjacent station information.

As shown in FIG. 2, base station information stored in the base station information storage area 37 of the maintenance apparatus 30 includes a piece of information for each of the base stations 10A, 10B, ... managed by the base station control apparatus 20. Each piece of base station information for a base station 10A, 10B, ... includes: an identifier ID of the base station in question; Pseudo Noise (PN) as one characteristic of communication between the base station in question and a mobile terminal; Channel (Ch) as another characteristic of the communication between the base station in question and a mobile terminal; and location information of the base station in question. Here, PN is a code used by a base station at a sending-receiving node between that base station and a mobile terminal at the time of modulating and demodulating data, in order to prevent interference with other communication. Ch is a radio wave frequency used by each base station. These PN and Ch are parameters indicating communication characteristics of each base station. Further, location information of a base station in question is expressed, for example, by longitude and latitude of a location at which the base station in question exists. The base station information acquisition unit 34 acquires each piece of base station information of a base station 10A, 10B, ... from the base station information storage area 14 of the base station in question 10A, 10B, ... through the BS communication unit 32.

As shown in FIG. 3, the adjacent station information storage area 15 of each base station 10A, 10B, ... stores the base station information (ID, PN, Ch and the location information) of its own base station, and in addition, information of each base station adjacent to its own base station, namely, an identifier, PN and Ch of each adjacent base station, as adjacent station information.

Figure 4:
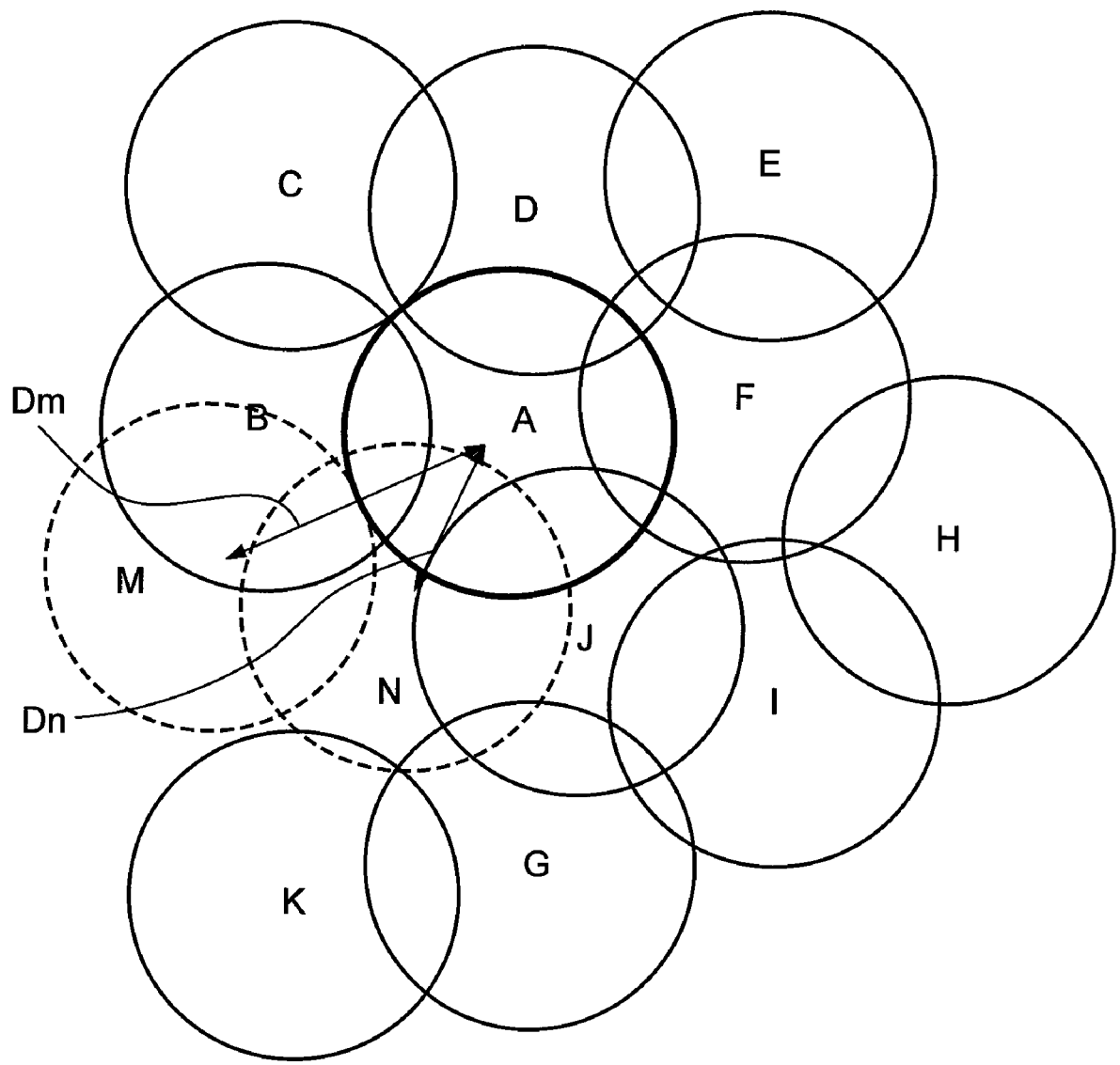
FIG. 4 is an explanatory diagram showing relations between respective service areas of base stations in the first embodiment of the present invention.

Assuming that the base station control apparatus 20 manages base stations A, B, C, ..., I and H as shown in FIG. 4, the base station information storage area 37 of the maintenance apparatus 30 stores information on all the base stations A, B, C, ..., I and H as described above. On the other hand, for example, as the adjacent station information for the station A, information on the base stations B, C, D, F and J adjacent to the base station A is stored, while information on the base stations E, G, H, I and K that are not adjacent to the base station A is not stored. In FIG. 4, circles of solid lines show service areas of existing base stations, while circles of broken lines show service areas of newly installed base stations.

Next, operation of handoff in the communication system of the present embodiment will be described.

As described above in the "Background of the Invention", handoff includes soft handoff in which communication of a mobile terminal 1 is continued and hard handoff in which a momentary break exists in communication of a mobile terminal 1. Thus, first, operation of the communication system at the time of soft handoff will be described referring to FIG. 5. Here, it is assumed that communication has been established between a mobile terminal 1 and the base station 10A, and the mobile terminal 1 is communicating with a public network through the base station 10A and the base station control apparatus 20.

The mobile terminal 1 monitors radio a wave transmitted by each base station 10A, 10B, and sends a Route Update message including signal intensity, Ch and PN of each base station 10A, 10B to the base station with which the communication has been established, i.e., the handoff source base station 10A (S1). When intensity of signal received from a base station with which communication has not been established yet becomes higher than the intensity of a signal received from the base station with which communication is established now as a result of change in the communication environment owing to movement or the like, it is preferable for the mobile terminal 1 to establish communication with the base station having the higher signal intensity. Thus, the mobile terminal 1 sends a Route Update message as handoff request information to the handoff source base station 10A with which communication is now established.

The handoff source base station 10A refers to the signal intensity, Ch and PN of each base station 10A, 10B included in this Route Update message in order to judge whether signal intensity of another base station 10B is higher than the signal intensity of the handoff source base station, i.e., the base station 10A itself (S2). In cases where signal intensity of no other base station 10B is higher than the signal intensity of the base station 10A itself, then the base station maintains the communication with the mobile terminal 1 until a Route Update message is received again. On the other hand, in cases where signal intensity of another base station 10B is higher than the signal intensity of the base station 10A itself, it is preferable to perform handoff to the base station 10B. Accordingly, the base station 10A judges whether values received as Ch and PN of the base station 10B are registered in the adjacent station information storage area 15 of the base station 10A itself (S3). In the case where the values of Ch and PN are registered in the adjacent station information storage area 15 of the base station 10A itself, then the base station 10A refers to the adjacent station information (FIG. 3) and confirms the identifier of the base station having these values of Ch and PN to specify a base station 10B having these values of Ch and PN. Then, the base station 10A sends a Handoff Request message to the specified base station 10B, i.e., a handoff destination base station (i.e. a base station to which communication with the mobile terminal 1 is changed) 10B (S4). Receiving the Handoff Request message from the handoff source base station 10A, the handoff destination base station 10B returns a Handoff Response message to the handoff source base station 10A in order to notify the handoff source base station 10A that it is possible to perform handoff (S5).

Receiving the Handoff Response message from the handoff destination base station 10B, the handoff source base station 10A sends a T-ch Assignment message to the mobile terminal 1, to notify the mobile terminal 1 that preparation for handoff has been completed (S8). In response, the mobile terminal 1 sends a T-ch Complete message to the handoff source base station 10A (S9), and establishes communication with the handoff destination base station 10B. Then, through the handoff destination base station 10B, the mobile terminal 1 communicates with the public network.

Next, operation of the communication system at the time of hard handoff will be described referring to FIG. 6.

At the time of hard handoff also, a Route Update message is sent from a mobile terminal 1 to a handoff source base station 10A (S1), signal intensities of the handoff source base station 10A and a handoff destination base station 10B are compared (S2), and Ch and PN in the Route Update message are searched for (S3), similarly to the case of soft handoff.

In cases where the handoff source base station 10A searches for Ch and PN (S3) and these Ch and PN do not exist in the adjacent station information held by the base station 10A itself, a soft handoff candidate can not be specified. Consequently, the handoff source base station 10A sends a Connection Close message to the mobile terminal 1 (S6) to disconnect the communication with the mobile terminal 1. As a result, communication between the mobile terminal 1 and the public network is interrupted momentarily.

Receiving the Connection Close message from the handoff source base station 10A (S6), the mobile terminal 1 sends a Route Update message and a Connection Request message to a handoff candidate base station 10B (S7). Similarly to the above-described handoff source base station 10A, the handoff candidate base station 10B, which receives these messages, compares the signal intensity of the base station 10B itself with signal intensities of the other base stations (S2a). In cases where the signal intensity of the base station 10B itself is higher then the signal intensities of the other base stations, then the base station 10B sends a T-ch Assignment message to the mobile terminal 1 to notify the mobile terminal 1 that preparation for handoff has been completed (S8b). In response, the mobile terminal 1 sends a T-ch Complete message to the handoff destination base station 10B (S9b) and establishes communication with the handoff destination base station 10B. Then, through the handoff destination base station 10B, the mobile terminal 1 communicates with the public network.

The above-described operation at the time of soft handoff and hard handoff is an operation standardized according to CDMA. On the other hand, according to the techniques of Patent Documents 1 and 2 described in the section of the background of the invention, when it is found in the step 3 that the adjacent station information held by the base station 10A itself does not register Ch and PN included in the Route Update message and a base station corresponding to Ch and PN can not be specified, messages that are not standardized in CDMA are sent and received.

Next, operation of the maintenance apparatus 30 in the communication system of the present embodiment will be described.

The control unit 16 of each base station 10A, 10B, . . . sequentially sends all protocol messages transmitted to and from each mobile terminal, including ones transmitted at the times of above-described soft handoff and hard handoff, to the base station control apparatus 20. The protocol message acquisition unit 33 of the maintenance apparatus 30 sequentially acquires the protocol messages sent from each base station 10A, 10B, . . . to the base station control apparatus 20, and registers the protocol messages classified by base station 10A, 10B, . . . in the protocol message storage area 36.

Figure 7:
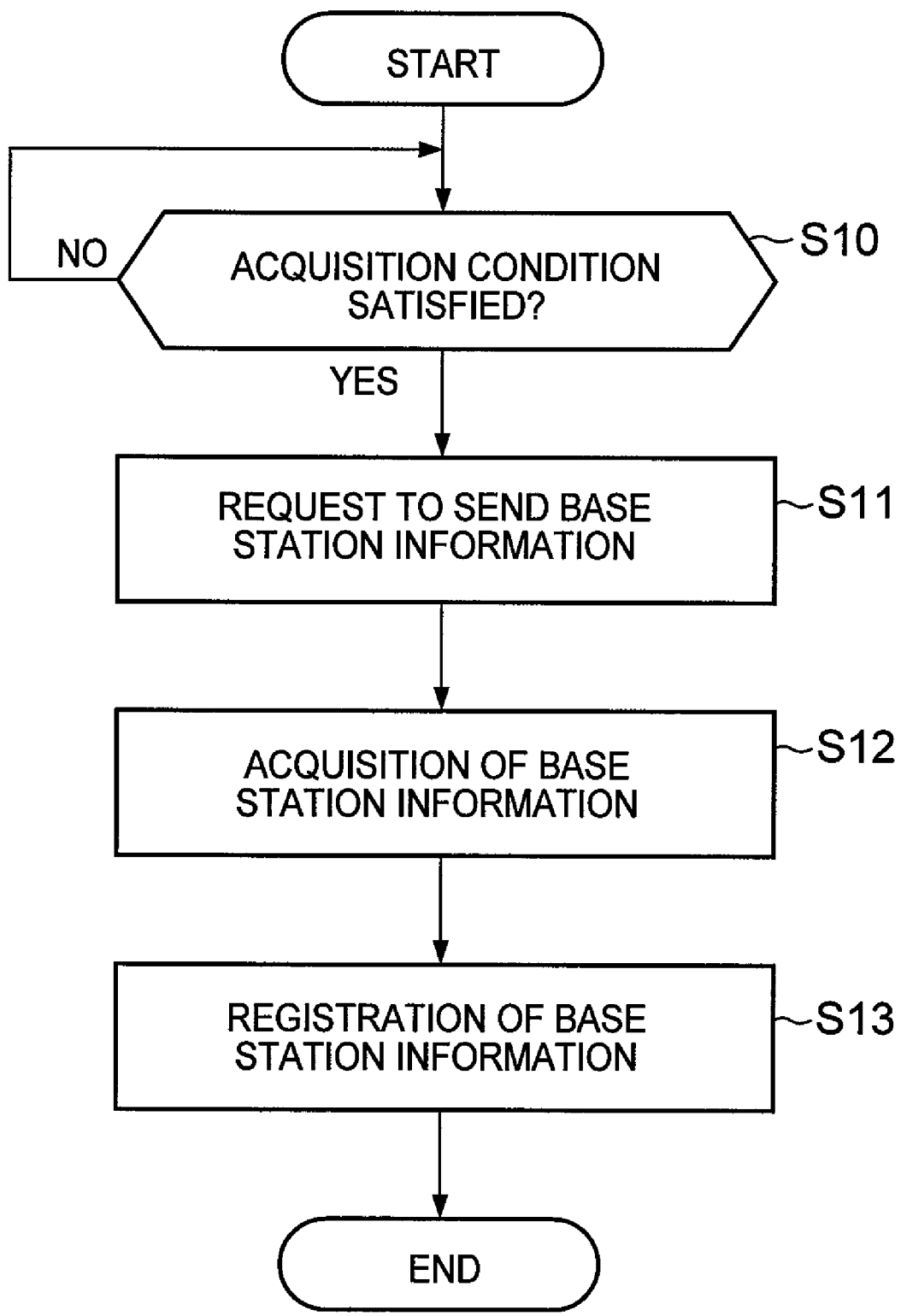
FIG. 7 is a flowchart showing operation of a base station information acquisition unit of the maintenance apparatus in the first embodiment of the present invention.

As shown in the flowchart of FIG. 7, when a predetermined acquisition condition is satisfied (S10), the base station information acquisition unit 34 of the maintenance apparatus 30 requests, through the BS communication unit 32 and the network 2, each base station 10A, 10B, . . . to send its own base station information (S11). Here, the acquisition condition is, for example, elapse of a predetermined time, reception of information from the outside to the effect that a new base station has been installed, or the like.

Receiving this request, the control unit 16 of each base station 10A, 10B, . . . reads its own base station information stored in the base station information storage area 14, and sends the base station information to the maintenance apparatus 30 through the M communication unit 12 and the network 2. Receiving the base station information from each base station 10A, 10B, . . . (S12), the base station information acquisition unit 34 of the maintenance apparatus 30 registers the base station information for each base station 10A, 10B, . . . in the base station information storage area 37 (S13).

For example, in cases where base stations M and N having respective service areas as shown by the circles of broken lines in FIG. 4, respective pieces of base station information of the base stations M and N are added to the base station information storage area 37 of the maintenance apparatus 30 as shown in FIG. 2.

Figure 8:
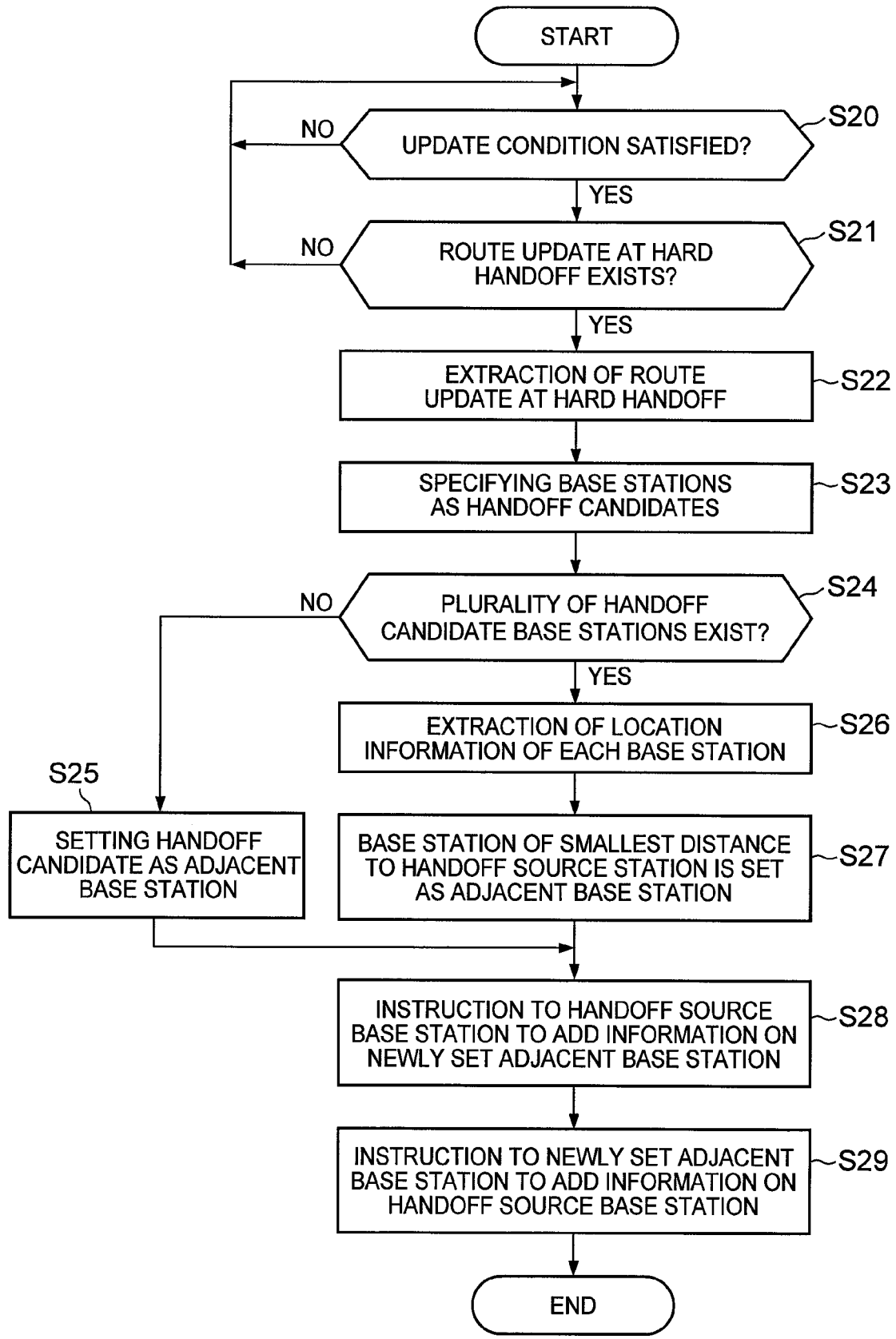
FIG. 8 is a flowchart showing operation of an information update instruction unit of the maintenance apparatus in the first embodiment of the present invention.

As shown in the flowchart of FIG. 8, when a predetermined update condition is satisfied (S20), the information update instruction unit 35 of the maintenance apparatus 30 searches for a Route Update message at the time of hard handoff among protocol messages stored in the protocol message storage area 36 (S21). Here, the predetermined update condition is, for example, elapse of a predetermined time, reception of information from the outside to the effect that a new base station has been installed, or the like. Further, the above-mentioned Route Update message at the time of hard handoff means a Route Update message in cases where a base station receives the Route Update message from a mobile terminal (S1 in FIG. 6) and thereafter the base station sends a Connection Close message to the mobile terminal (S6).

In cases where there is a Route Update message at the time of hard handoff among the protocol messages stored in the protocol message storage area 36, the information update instruction unit 35 extracts that Route Update message including handoff request information (S22). Then, referring to base station information stored for each base station in the base station information storage area 37, the information update instruction unit 35 finds out base station identifier corresponding pairs of Ch and PN of the base stations included in that Route Update message, to specify base stations as handoff candidates (S23).

For example, in cases where, in addition to Cha and PNa of the handoff source base station 10A with which communication is currently established, Chm and PNm and Chn and PNn of other base stations as handoff candidates are included as Ch and PN in the Route Update message, then the information update instruction unit 35 refers to base station information (FIG. 2) stored for each base station in the base station information storage area 37, and extracts base station identifiers IDm and IDn corresponding to Chm and PNm and Chn and PNn of the other base stations, to specify relevant base stations M and N.

Then, the information update instruction unit 35 judges whether a plurality of base stations exist as handoff candidates (S24). In cases where only one handoff candidate exists, the handoff candidate base station in question is determined as an adjacent base station to the handoff source base station (S25). On the other hand, in cases where a plurality of handoff candidates exist, the information update instruction unit 35 extracts location information of the handoff source base station and handoff candidate base stations out of the base station information for base stations stored in the base station information storage area 37 (S26). For example, when it is assumed as described above that the base stations M and N are specified as the handoff candidate base stations, then a plurality of handoff candidates exist. Accordingly, location information (location a, location m and location n) of the handoff source base station A and handoff candidate base stations M and N is extracted from the base station information shown in FIG. 2. Then, the information update instruction unit 35 finds the distance between the handoff source base station and each handoff candidate base station, based on the extracted location information (location a, location m and location n). The information update instruction unit 35 determines a handoff candidate base station having the smallest distance as an adjacent base station for the handoff source base station (S27). For example, in cases where the base stations M and N are the handoff candidate base stations as described above, then the information update instruction unit 35 finds the distance Dm (=location a–location m) between the handoff source base station A and the handoff candidate base station M as well as the distance Dn (=location a–location n) between the handoff source base station A and the handoff candidate base station N. Assuming that the distance Dn between the handoff source base station A and the handoff candidate base station N is smaller than the distance Dm between the handoff source base station A and the handoff candidate base station M as shown in FIG. 4, the handoff candidate base station N having the smaller distance is determined as the adjacent base station for the handoff source base station.

In cases where a plurality of handoff candidate base stations exist, basically it is preferable to select, as an adjacent base station for the handoff source base station, a handoff candidate base station having the best conditions of communication with the handoff source base station. However, here it is considered that communication conditions of a base station having a shorter distance from the handoff source base station are better, and a handoff candidate base station having the shortest distance is selected as an adjacent base station.

When the information update instruction unit 35 determines the adjacent base station in the step 25 or 27, the information update instruction unit 35 instructs the handoff source base station to add information of the identifier, Ch and PN of the adjacent base station (S28). For example, when the base station N is determined as the adjacent base station for the handoff source base station A in step 25 or 27, the information update instruction unit 35 instructs the handoff source base station A to add IDn, PNn, and Chn, i.e., the information on the base station N. As a result, the information on the base station N, namely, IDn, PNn, and Chn, are added to the adjacent station information of the handoff source base station A, as shown in FIG. 3.

Further, the information update instruction unit 35 also instructs the new adjacent base station to add the information on the handoff source base station, namely, the identifier, Ch and PN of the handoff source base station as an adjacent base station for the new adjacent base station in question (S28). For example, when the base station N is determined as an adjacent base station for the handoff source base station A, then the handoff source base station A becomes an adjacent base station for the base station N. Thus, the information update instruction unit 35 instructs the adjacent base station N to add IDa, PNa and Cha of the handoff source base station, as adjacent station information. As a result, the information on the handoff source base station is added to the adjacent station information of the newly installed base station N also.

Hereinabove, the base station A has been taken as an example of the handoff source base station. However, as shown in FIG. 4, in cases where the base station J becomes a handoff source base station also, the information on the newly-installed base station N is similarly added to the adjacent station information of the handoff source base station J. The information on the base station J is added to the adjacent station information of the newly installed base station.

As described above, according to the present embodiment, for example even when a new base station is installed, it is possible to automatically update adjacent station information of a base station adjacent to that newly installed base station, and it is also possible to automatically generate adjacent station information of the newly installed base station.

Further, according to the present embodiment, a protocol message generated by standardized operations of CDMA are stored, and an adjacent base station is specified based on these stored protocol messages and previously stored base station information. Thus, it is possible to automatically update adjacent station information without making any change to existing mobile terminals and existing base stations.

Next, a second embodiment of radio communication system will be described referring to FIGS. 9 and 10.

In the above-described first embodiment, each base station holds its own adjacent station information. On the other hand, in the present embodiment, a base station control apparatus 20a holds adjacent station information of every base station together as shown in FIG. 9, while other features of configuration are basically similar to the first embodiment.

Accordingly, the base station control apparatus 20a of the present embodiment has an adjacent station information storage area 25 that stores adjacent station information for each base station. Further, each base station 10aA, 10aB does not have an adjacent station information storage area 15.

Figure 5:
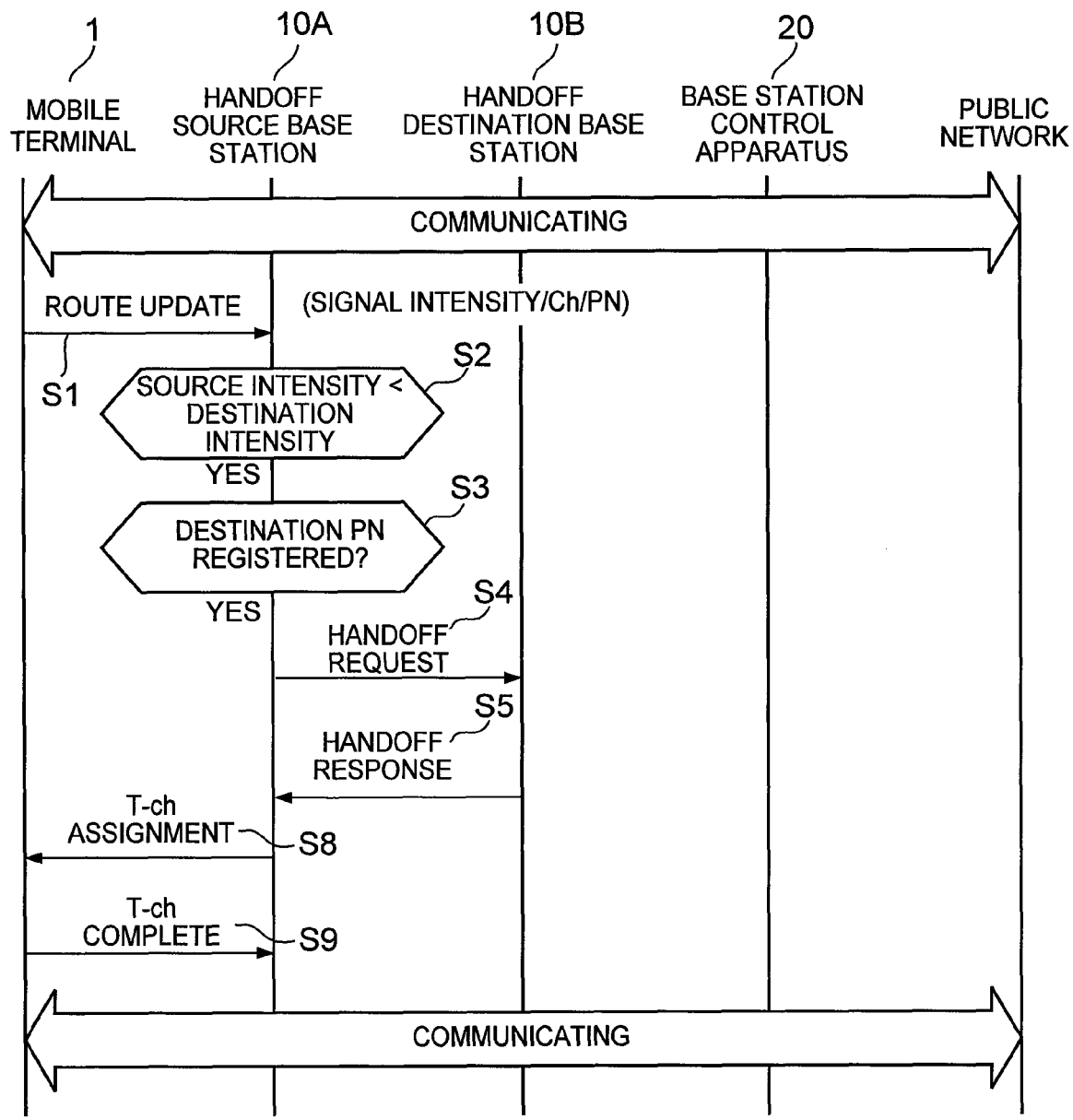
FIG. 5 is a sequence diagram of soft handoff in the system of the first embodiment of the present invention.
Figure 6:
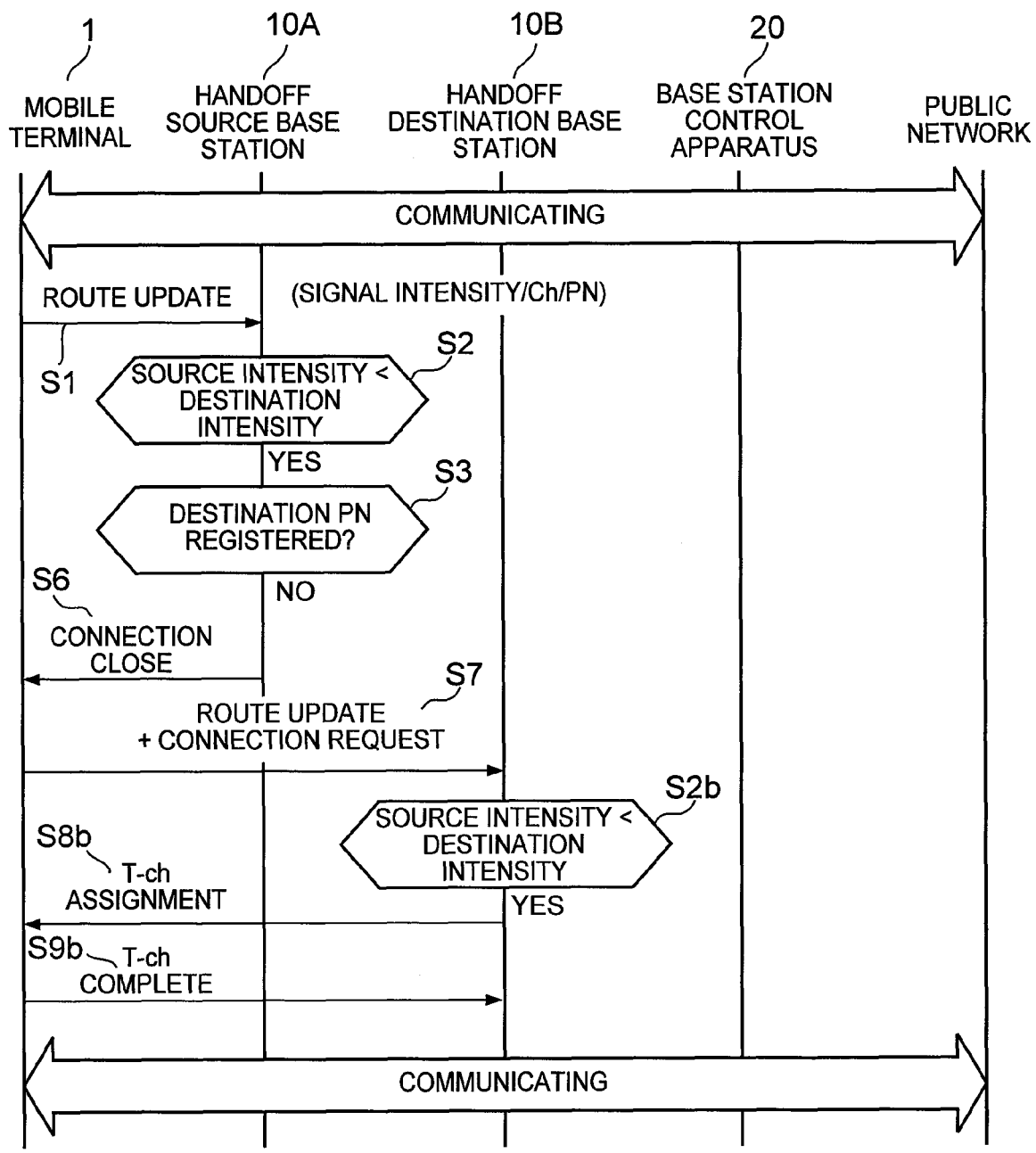
FIG. 6 is a sequence diagram of hard handoff in the system of the first embodiment of the present invention.

Thus, since the base station control apparatus 20a has the adjacent station information storage area 25, at least the judgments in step 3 in FIGS. 5 and 6 are made by the base station control apparatus 20a. Alternatively, a handoff source base station acquires the adjacent station information from the base station control apparatus 20a and makes those judgments. In cases where the base station control apparatus 20a makes the judgments in the step 3, the base station control apparatus 20a may make the judgments of steps 2 and 2a.

Figure 9:
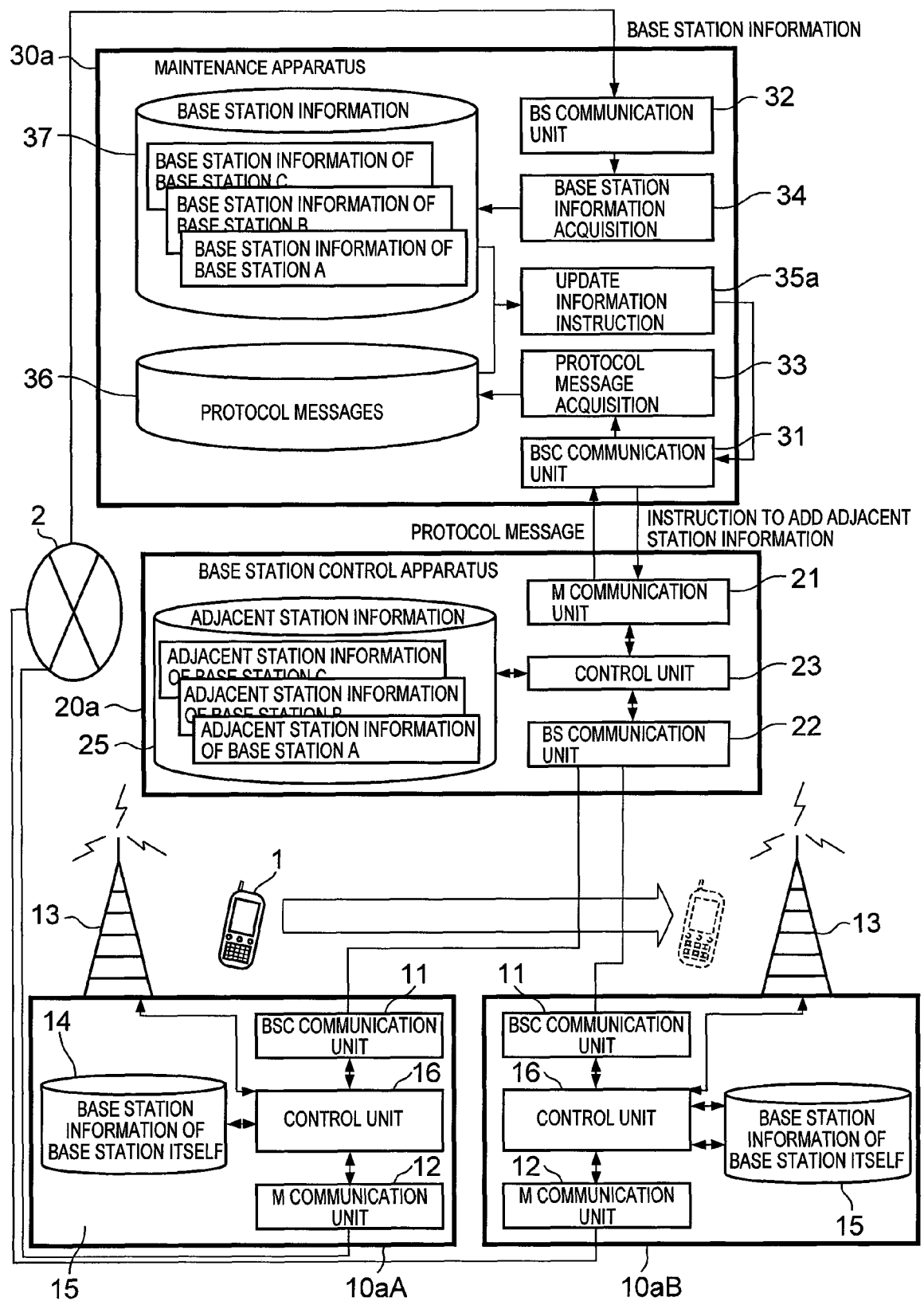
FIG. 9 is a schematic block diagram showing a radio communication system of a second embodiment according to the present invention.

Further, since the base station control apparatus 20a has the adjacent station information storage area 25, the information update instruction unit 35a of the maintenance apparatus 30a instructs the base station control apparatus 20a to add adjacent station information, as shown in FIGS. 9 and 10 (S28a).

Thus, each base station may hold its adjacent station information as in the first embodiment, or the base station control apparatus 20a may hold adjacent station information for every base station together as in the present embodiment.

Further, in the above embodiments, each base station holds its own base station information. However, for example, the maintenance apparatus 30, 30a may hold base station information of every base station together, while each base station does not register its own base station information. In that case, an operator or the like of the maintenance apparatus 30, 30a inputs base station information of a newly installed base station through an input unit such as a keyboard. At that time, the base station information acquisition unit 34 receives the base station information from the input unit and registers the base station information into the base station information storage area 37.

The invention claimed is:

1. An adjacent station information management apparatus in a radio communication system, the radio communication system comprising: a plurality of base stations performing radio communication with mobile terminals using Code Division Multiple Access (CDMA), and a base station control apparatus controlling the plurality of base stations, the adjacent station information management apparatus updating and managing adjacent station information that is stored in an adjacent station information storage area provided in each of the plurality of base stations and that includes an identifier of at least one adjacent base station, adjacent to a base station concerned, and communication characteristic information indicating communication characteristics of the adjacent base station, or the adjacent station information of at least one adjacent base station adjacent to each of the plurality of the base stations, that is stored in an adjacent station information storage area provided in the base station control apparatus, wherein the adjacent station information management apparatus comprises:
 a protocol message acquisition means which acquires, for each base station under management of the base station control apparatus, protocol messages wirelessly transmitted between a mobile terminal and a base station based on standardized operations;
 a protocol message storage area for storing the protocol messages of each base station, acquired by the protocol message acquisition means;
 a base station information acquisition means, which acquires base station information for each base station under management of the base station control apparatus, based on a predetermined acquisition condition, the base station information including an identifier of each base station and communication characteristic information indicating communication characteristics of the base station;
 a base station information storage area for storing, for each base station, the base station information of each base station, acquired by the base station information acquisition means; and
 an information update instruction means, which: extracts, from the protocol message storage area, combinations of protocol messages between the mobile terminal and the base station indicating that hard handoff is performed; uses communication characteristic information of a handoff candidate base station, included in a protocol message, among the combinations of protocol messages, that is transmitted to the base station by the mobile terminal, in order to specify a base station identifier corresponding to the communication characteristic information, from among a plurality of base station identifiers preliminarily acquired and stored in the base station information storage area; and instructs a base station or the base station control apparatus, that can access adjacent station information of the handoff source base station, to add the base station identifier specified as the handoff candidate, and the communication characteristic information, as adjacent station information of the handoff source base station.

2. An adjacent station information management apparatus for managing adjacent station information according to claim 1,
 wherein the base station information acquisition means acquires location information of a base station in addition to identifier and communication characteristic information of the base station, as the base station information, and
 wherein when the protocol message transmitted to the base station from the mobile terminal includes a plurality of handoff candidate base stations, the information update instruction means extracts from the base station information storage area a base station identifier and location information corresponding to respective communication characteristic information of the plurality of handoff candidates included in the protocol message; extracts location information of the base station before handoff; specifies a handoff candidate closest to the handoff source base station from among the plurality of handoff candidates, based on the location information of the respective base stations; and instructs a base station or the base station control apparatus, that can access the adjacent station information of the handoff source base station, to add the base station identifier and the communication characteristic information of the closest handoff candidate, as adjacent station information of the handoff source base station.

3. An adjacent station information management apparatus for managing adjacent station information according to claim 1,
 wherein the information update instruction means instructs a base station or the base station control apparatus, that can access adjacent station information of the handoff candidate base station whose base station identifier and communication characteristic information are added as the adjacent station information of the handoff source base station, to add an identifier and communication characteristic information of the handoff source base station, as adjacent station information of the handoff candidate base station.

4. A radio communication system comprising:
 an adjacent station information management apparatus according to claim 1;
 the plurality of base stations; and
 the base station control apparatus.

5. An adjacent station information management method in a radio communication system comprising a plurality of base stations performing radio communication with mobile terminals using Code Division Multiple Access (CDMA), and a base station control apparatus controlling the plurality of base stations, for managing adjacent station information that is provided in each of the plurality of base stations and that includes an identifier of at least one adjacent base station, adjacent to a base station concerned, and communication characteristic information indicating communication characteristics of the adjacent base station, and the base station information of at least one adjacent base station adjacent to each of the plurality of base stations, that is provided in the base station control apparatus, wherein the adjacent station information management method performs:
- a protocol message acquisition step, in which, for each base station under management of the base station control apparatus, protocol messages wirelessly transmitted between a mobile terminal and a base station are acquired based on standardized operations, and the protocol messages for each base station are stored in a protocol message storage area;
- a base station information acquisition step, in which, for each base station under management of the base station control apparatus, base station information including an identifier of each base station and communication characteristic information indicating communication characteristics of the base station is acquired, based on a predetermined acquisition condition, and base station information of each base station is stored in a base station information storage area; and
- an information update instruction step, of: extracting, from the protocol message storage area, combinations of protocol messages between the mobile terminal and the base station indicating that hard handoff is performed; using communication characteristic information of a handoff candidate base station, included in a protocol message, among the combinations of protocol messages, that is transmitted to the base station by the mobile terminal, to extract a base station identifier corresponding to the communication characteristic information, from among a plurality of base station identifiers preliminarily acquired and stored in the base station information storage area; and instructing a base station or the base station control apparatus, that can access adjacent station information of the handoff source base station, to add the extracted base station identifier and the communication characteristic information, as adjacent station information of the handoff source base station.

* * * * *